Sept. 16, 1941.   F. S. FARLEY   2,256,081
MOLD-CHARGING APPARATUS
Filed Jan. 5, 1940   3 Sheets-Sheet 1

INVENTOR
Francis S. Farley
BY
ATTORNEY

Sept. 16, 1941.  F. S. FARLEY  2,256,081

MOLD-CHARGING APPARATUS

Filed Jan. 5, 1940 3 Sheets-Sheet 2

INVENTOR
Francis S. Farley
BY Wm R Davis
ATTORNEY

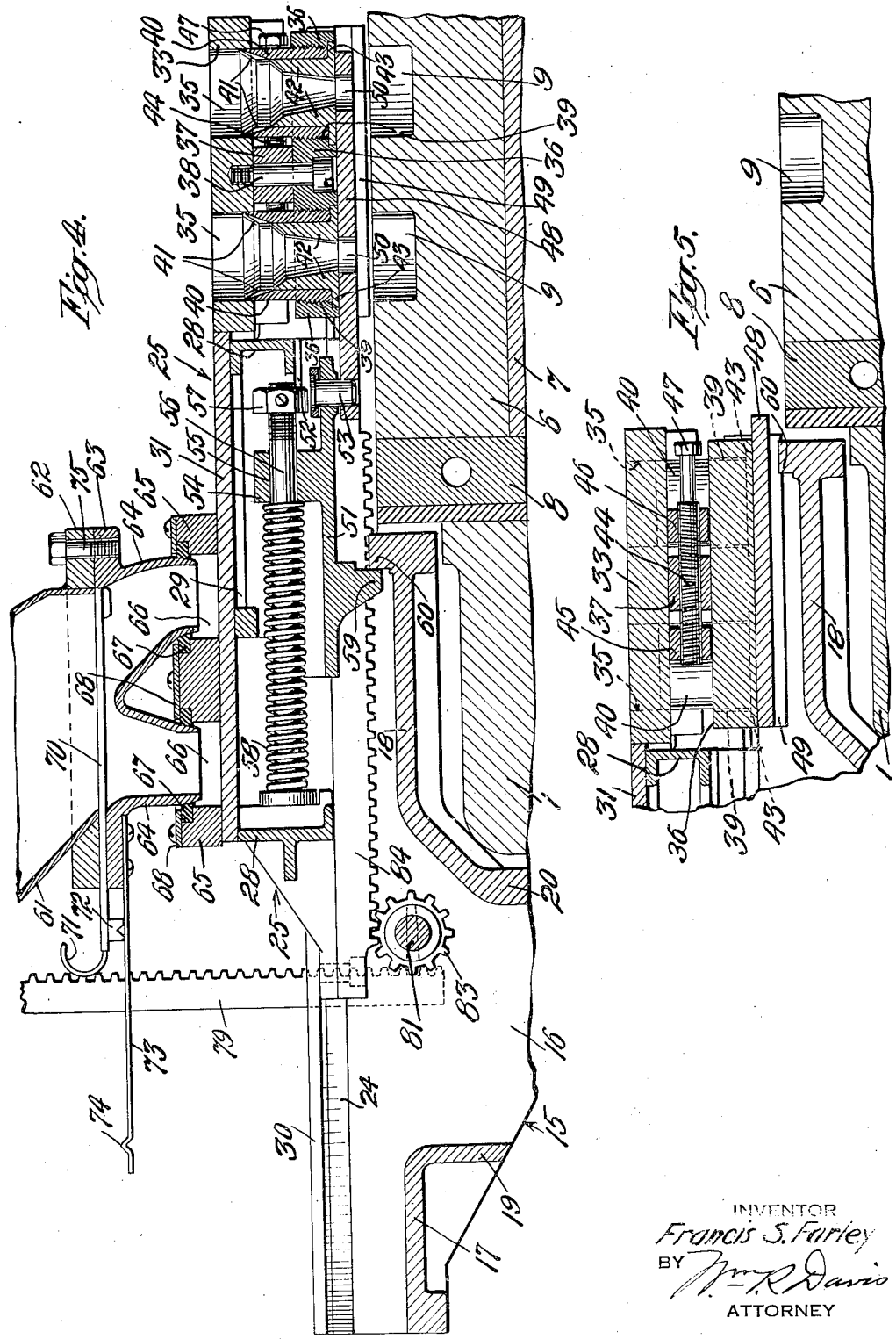

Patented Sept. 16, 1941

2,256,081

UNITED STATES PATENT OFFICE 2,256,081

MOLD-CHARGING APPARATUS

Francis S. Farley, Westfield, N. J., assignor to The Watson-Stillman Co., Roselle, N. J., a corporation of New Jersey Application January 5, 1940, Serial No. 312,449

6 Claims. (Cl. 18—16)

This invention relates to improvements in mold-charging apparatus for receiving and measuring charges of moldable material and conveying the measured charges to a delivery position over a mold and depositing them into the mold cavities.

Important objects of the invention are to provide such an apparatus of generally improved design; to provide in such an apparatus an improved charge carrier for conveying the material from a charging point to delivery position over the mold, and improved means for dumping the charges from the carrier into the mold cavities; to provide satisfactory adjustable measuring means for varying the volume of the charges conveyed by the carrier; and to provide improved operating means for reciprocating the carrier between its charge-receiving position and its delivery position.

Other objects of the invention will appear hereinafter.

In the drawings, Fig. 1 is a vertical sectional view of the apparatus showing it operatively associated with a compression molding machine, the latter being partly broken away, and the charge carrier being in a retracted position to receive charges of moldable material;

Fig. 4 is a vertical sectional view similar to Fig. 1 but upon a larger scale, with parts further broken away and with the charge carrier advanced to a position to charge the cavities of a mold or die; and Fig. 5 is an enlarged detail horizontal section on the line 5—5 of Fig. 4.

Figure 1:
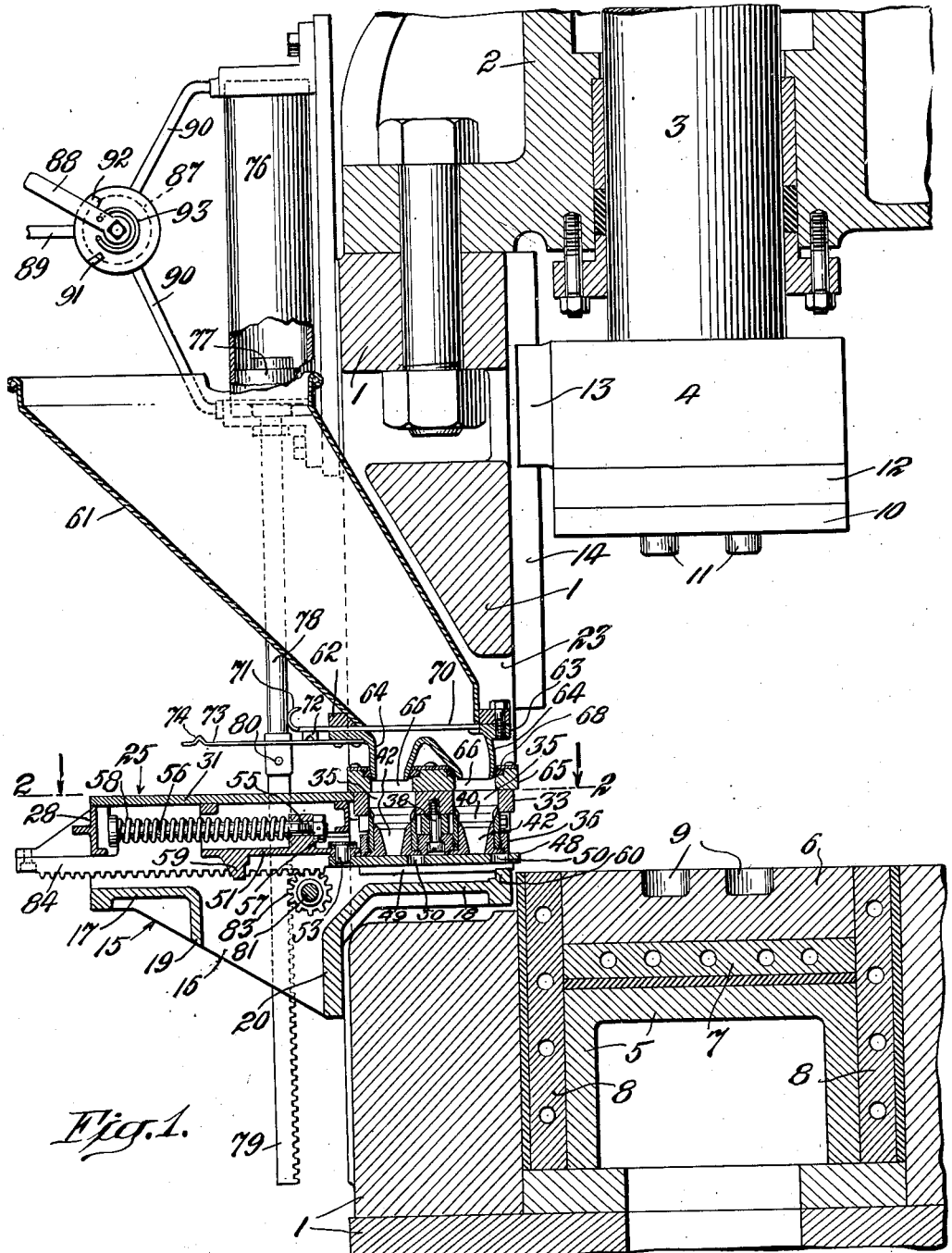

The charging apparatus is shown in association with a press or molding machine for molding thermosetting materials. However the apparatus may be employed satisfactorily with machines for various types of molding work. In the present disclosure the press includes a main frame structure 1, a hydraulic cylinder 2 borne by said frame and in which a ram 3 is vertically reciprocable, and a press head 4 borne by the ram at its lower end. A bolster 5 borne by the press frame supports a mold block or die 6 in a fixed position below said press head. A heating plate 7 is interposed between the bolster and the under side of said die, and other heating plates 8 are supported at opposite sides of the die. In the present instance the die has cup-like cavities 9 in its upper surface. The press head 4 rigidly bears, at its under side, a die plate 10. In the present instance this plate bears die elements in the form of force plugs or cores 11 to enter the cavities 9 and cooperate therewith for molding cup-like articles. A heating plate 12 is also borne by the press head 4 and is interposed between the under side of the head and the die plate. A projection 13 upon one side of the press head slidably fits between vertical guides 14 upon the press frame to prevent rotary movement of the press head about the axis of the ram and hold the die element 10 trued with relation to the cavities 9.

The charging apparatus is employed for charging the die cavities 9 with moldable material in granular or powdered form. The apparatus includes a base casting 15 formed with vertical side walls 16 and cross webs connecting said walls and forming horizontal walls 17 and 18 in the same plane and vertical walls 19 and 20 depending from the walls 17 and 18 respectively. Said vertical walls are spaced apart and located at intermediate points in the length of the casting. Walls 16 are formed with outwardly extending lateral flanges 21 located in the plane of the wall 20 and secured by bolts 22 to an outer side of the press frame 1. Thereby the casting is rigidly secured to the frame. The frame has an opening 23 through which the casting projects toward the die 6. At their upper edges the side walls 16 are rabbeted to form parallel horizontal guides 24 for slidably supporting a charge carrier 25.

The charge carrier includes a body formed of a single casting having parallel opposite side walls 26 with lateral flanges 27 formed to slidably fit in the guides 24, vertical cross walls 28 and horizontal cross webbing 29 all connecting the walls 26. Cleats 30 screw-fastened to the upper edges of the walls 16 of the base casting retain the flanges 27 in the guides. A flat plate 31 is supported in a horizontal position upon the upper side of the body casting of the carrier and is secured thereto by screws 32. In advance of said plate, that is at the right thereof with reference to Figs. 1 and 2, there is another flat horizontal plate 33. This plate is thicker than plate 31 and it is supported by the carrier body with its rear edge abutting the forward edge of plate 31 and with its upper surface flush with the upper surface of plate 31. Screws 34 secure the plate 33 to the carrier body. Said plate has cylindrical bores 35. In the present instance there are eight of these bores to aline with a corresponding number of the die cavities 9 when the carrier is in delivery position. The bores are in two groups of four, spaced apart crosswise of the carrier. In each group the bores are in pairs spaced apart lengthwise of the carrier.

A plate 36 is borne by the carrier body in a position spaced below the plate 33 and parallel thereto. Between said plates there are three spacer bars 37. One of said bars extends lengthwise of the carrier body in a position between the two groups of bores and the other two bars are arranged crosswise of the carrier in positions between the pairs of bores in the groups. Bolts 38 pass upwardly through the spacer bars and have their upper ends screwed into the plate 33. At their lower ends said bolts have heads which are countersunk in the plate 36. Thereby plate 36 is rigidly supported on the carrier body in a spaced relation to plate 33. Plate 36 has eight bores 39 alining vertically with the apertures 35 and screw-threaded. A bushing 40 is fitted within each pair of alining bores 35 and 39. The lower end portion of the bushing is externally screw-threaded and screw-engaged with the thread in the bore 39. The upper end portion of the bushing is smooth and cylindrical externally and fits snugly within the bore 35. The bore of the bushing is cylindrical for most of its length and flared at its upper end to meet the outer surface of the bushing. Said flare has diametrically arranged slots or kerfs 41 engageable by a tool for rotating the bushing and screw adjusting it vertically within the bore 35.

A second bushing 42 is fitted within the bore of each bushing 40 and has a flange 43 at its lower end fitting within a countersink around the lower end of the bore 39 to hold the bore against upward displacement. The lower end of bushing 42 is flat and flush with the under face of plate 36. The bore of the bushing 42 is sharply flared at its upper end to meet the outer cylindrical surface of the bushing and tapers downwardly from the flare to the lower end of the bushing. Flange 43 also provides an abutment for the bushing 40 to limit downward adjustment of the latter. The height of bushing 40 is such that when it abuts said flange its upper end projects only slightly into the bore 35. The height of bushing 42 is such that when bushing 40 abuts said flange the upper end of bushing 42 will be spaced below the flare at the upper end of the bore in bushing 40. The bore of bushing 42, the exposed portion of the bore of bushing 40 above bushing 42 and the portion of bore 35 exposed above bushing 40 together define a cavity to contain a measured charge of moldable material for delivery into one of the die cavities 9. By screw-adjustment of bushing 40 to protrude to a greater or less degree into bore 35 the capacity of the carrier cavity may be adjusted accurately according to the amount of material required for charging the cavity 9 to the proper degree.

Means are provided for simultaneously locking the four bushings 40 of either group in their adjustments. The spacing bar 37 which separates the front and rear pairs of the group has a centrally located transverse bore. A screw 44 extends through said bore and has spaced right and left hand screw threads. Rearwardly of the bar 37 one of said threads is screw-engaged in a threaded bore in a brake shoe block 45 formed to engage the peripheries of the rear pair of bushings 40 where they are exposed between the plates 33 and 36. Forwardly of the bar 37 the other of said threads is screw-engaged in a threaded bore of a similar brake shoe block 46 formed to engage the exposed portion of the peripheries of the forward pair of bushings 40. By turning the screw in one direction both of said brake shoes are moved to lock the front and rear pair of bushings simultaneously against turning. Rotation of the screw in the opposite direction retracts the brake shoes from the bushings to release the latter for adjustment. The shank of the screw extends to a point near the forward end of the carrier and has a head 47 for turning it.

Beneath the plate 36 there is a flat dump plate 48. Guide cleats 49 are screw-fastened to the under side of plate 36 and support the dump plate against the under side of plate 36 for sliding fore-and-aft relatively to the latter. The dump plate has holes 50 corresponding in number to the number of bores 35 in plate 33 and similarly arranged in groups. Said holes 50 are slightly larger than the lower ends of the bores of the bushings 42. In a normal position of the dump plate the apertures 50 are spaced forward out of register with said bores so that the plate closes the lower ends of the bores to retain the charges within the carrier cavities.

A crosshead plate 51 is supported for fore-and-aft sliding in guides 52 borne by the carrier body at its under side. The forward end portion of the crosshead plate overlaps a rear end portion of the dump plate and bears a pin 53 which projects downward into an aperture in the dump plate to provide a push-and-pull connection between the plates. The crosshead plate has an upward extension 54 formed with a fore-and-aft bore 55. A fore-and-aft extending rod 56 has its rear end affixed to the rear wall 28 of the carrier body and is slidably fitted in said bore 55. Forwardly of the latter the rod is screw-threaded and has a nut 57 screwed thereon, to provide an adjustable abutment engageable by the crosshead extension 54. A compression spring 58 is interposed between an abutment boss on the rear wall 28 and the crosshead extension 54 and acts on the latter to constantly urge the crosshead and dump plate forward. The nut 57 is adjusted to limit forward movement of the crosshead and dump plate relatively to the carrier body and stop the plate with the holes 50 thereof advanced out of alinement with the bores of the bushings 42.

The charge carrier is supported by the guides 24 for reciprocation through the frame opening 23 between a position in which the carrier is entirely offset from the die 6 and a position in which the lower ends of the bores of the bushings 42 are located directly over the die cavities 9. Provision is made for automatically causing said bores and the holes 50 in the dump plate to register in the latter position of the carrier, for discharge of the material from the charge cavities of the carrier to the die cavities. The crosshead plate 51 is formed with a downwardly projecting stop 59 and the casting 15 is formed with an upwardly projecting fixed stop 60 located in the path of stop 55. When the carrier is in its normal, retracted position, as shown in Fig. 1, stop 59 is spaced rearward from stop 60 a distance corresponding to the horizontal distance between the holes 50 and the respective die cavities 9 with which they are to register. By adjustment of the nut 57 the distance between the stops can be accurately adjusted. When the carrier is advanced the spring 58 constrains the crosshead plate and its stop 59 to travel with the carrier until said stop contacts the fixed stop 60. Thereby the dump plate is stopped with its holes 50 in register with the die cavities. Further advance of the carrier relatively to the dump plate and against the resistance of spring 58 brings the bores of the bushings 42 into register with the holes 50 for dumping the charge into the die cavities. Upon retraction of the carrier the body thereof first moves back relatively to the dump plate to shift said bores out of register with the holes 50 while the dump plate is held in its advanced position by the spring 58. Then the nut 57 engages the crosshead extension 50 to pick up the crosshead and cause it and the dump plate to travel rearward with the body of the carrier.

Figures 2, 3:
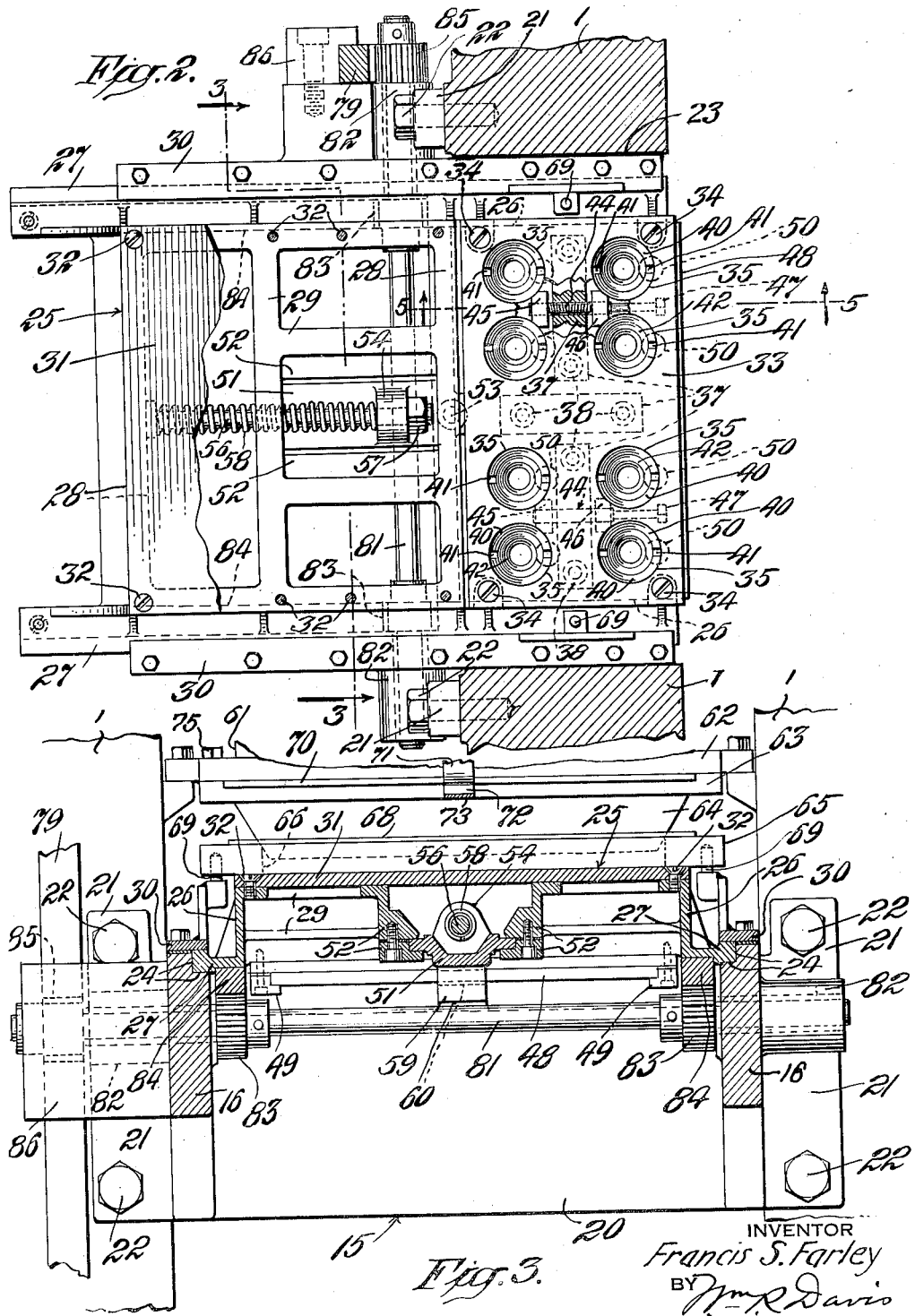
Fig. 2 is an enlarged horizontal section on the line 2—2 of Fig. 1, showing the charge carrier in top plan and with top plates thereof partly broken away to disclose underlying structure.
Fig. 3 is an enlarged vertical section on the line 3—3 of Fig. 2.

Provision is made for charging the carrier cavities when the carrier is fully retracted. A hopper 61 for the material is supported by a horizontal plate 62 which is secured to the press frame. Said plate has an opening in which the lower open end of the hopper is fitted. A plate 63 is secured to the under side of plate 62 and is formed with a pair of spouts 64 under the lower end of the hopper. These spouts are elongated crosswise of the carrier for charging all of the charge cavities across the carrier. At the lower ends of the spouts there is a flat horizontal plate 65 formed with elongated openings 66 into which said ends of the spouts protrude. The upper surface of plate 65 is countersunk around the openings 66 to contain compressible packings 67 which fits around the exterior of the spouts. A plate 68 secured to the upper face of plate 65 retains the packings in place. The fore-and-aft spacing of the openings 66 corresponds to that of the bores 35, for registration therewith when the carrier is in normal, retracted position. In said position the plate 65 rests upon the carrier plate 33. Plate 65 is held in a fixed horizontal position by fixed pins 69 borne by the guide cleats 30 and projecting upward into bores in the plate, as shown in Fig. 3. As the carrier is advanced the plate rests upon the carrier plate 31. It serves as a wiper for leveling the charges in the carrier cavity as the carrier is advanced and its bores 35 are moved out of register with the openings 66.

Delivery from the hopper to the spouts is controlled by a closure plate 70 slidably borne by plate 63 to shift horizontally across the lower end of the hopper. It extends beyond the rear edge of plate 63 and has a handle 71 for manipulating it. It also has a downwardly projecting lug 72 with a V-notch. A spring leaf 73 is secured to plate 63, extends rearward therefrom and has a locking projection 74 to snap into the said notch for yieldably retaining the closure plate 66 in fully open position. Plate 63 is detachably secured to plate 62 by bolts 75 so that plate 63 may be replaced by a plate with a different number or arrangement of spouts. The carrier plates 33, 36 and 43 are also removably retained to the carrier body so that they may be replaced by plates designed to provide for different numbers, sizes and arrangements of charge cavities in the carrier.

The carrier is reciprocated by fluid pressure operated means. An air cylinder 76 is mounted upon the press frame in a vertical position spaced above the level of the charge carrier. Said cylinder has a piston 77 fitted therein and provided with a piston rod 78 extending downwardly from the cylinder. A vertical gear rack 79 is detachably connected, as at 80, to the lower end of the piston rod. Beneath the carrier there is a horizontal cross-shaft 81 rotatably mounted in bearings 82 borne by the opposite side walls 16 of the casting 15. A pair of gears 83 are keyed to said shaft at points just inside of the walls 16 and mesh with a pair of parallel horizontal racks 84 secured to the under side of the carrier body. The shaft extends outwardly beyond one of its bearings and has a gear 85 affixed thereto and meshing with the vertical rack 79, the latter being disposed at the rear side of the gear. A guide 86 screw-fastened to a boss on the adjacent casting wall 16 holds the vertical rack in mesh with gear 85.

Air pressure in cylinder 76 may be controlled by any suitable means to cause reciprocation of piston 77 and rack 79. In Fig. 1 there is indicated a rotary valve 87 having an operating handle 88. A pipe 89 leads from a compressed air source, not shown, to said valve, and piping 90 leads from the valve to opposite ends of the cylinder. By rotating the valve in one direction until the handle contacts a stop 91 air may be exhausted from the upper side of the piston and air under pressure admitted to the lower side of the piston for forcing the piston and rack 79 upward. By rotation of the valve in the opposite direction until the handle engages a stop 92 air may be exhausted from the under side of the piston and compressed air admitted to the upper side of the piston to force it and the rack downward. A spring 93 is indicated for swinging the valve handle to said position for causing downward movement of the piston. The valve construction forms no part of the present invention and so it is not illustrated in detail.

Upward movement of the rack 79, through the gearing shown and described, causes advance of the charge carrier to a position over the die 6 for charging the cavities 9, the dump plate 48 having its advance limited by the stops 59 and 60 so that the plate is stopped with its holes 60 in position over the cavities 9, for dumping the charges. Downward movement of the rack 79 causes retraction of the carrier to a position clear of the die 6 and with the charge cavities of the carrier directly beneath the charging openings 66 and the spouts 64, for charging said cavities. The stroke of the rack 79 and the movement of the carrier are properly limited by contact of bosses on the opposite faces of the piston 77 with the opposite ends of the cylinder 76.

The carrier may be withdrawn rearwardly from the supporting casting 15 after detaching the rack 79 from the piston rod 78 and lowering the rack farther so that the gears 85 and 83 can rotate farther and the carrier racks 84 can move outward beyond the gears 83. Then the carrier may be slid from the guides 24 and removed from the casting for convenient servicing or for replacement of the plates 33, 36, 48, 63 and 65 by other plates designed for charging die cavities differing in number, arrangement or size from those shown.

What I claim is:

1. Mold-charging apparatus including a charge carrier comprising a body with vertically spaced horizontal plates having bores in vertical alinement, a bushing fitted in the alining bores and of less height than the distance between the upper end of the bore in the upper plate and the lower end of the bore in the lower plate, a bushing fitted within the lower end portion of said first bushing and held against vertical displacement relatively to said plates, said bushings being inwardly beveled at their upper ends and the first bushing protruding above the second bushing.

the exposed interiors of said bushings together with the bore in the upper plate defining a charge-receiving cavity open at its upper and lower ends, a screw thread connection between the first bushing and the bore of the lower plate for vertical adjustment of the first bushing in the bores to vary the degree of said protrusion and thereby vary the capacity of said cavity, locking means in the space between the plates and engageable with the first bushing to lock it in its different adjustments, a closure plate shiftably supported by the carrier body at the under side of the lower plate to open and close the bottom of said cavity, and a spring connection between the body and said closure plate normally holding the latter in closed position; guide means supporting the carrier for horizontal reciprocation to shift said cavity between a charge-receiving position and a delivery position over a mold; and means operable by advance of the carrier toward the latter position to cause relative shift between the carrier body and the closure plate against the resistance of said spring connection to open the lower end of the cavity in the final stage of said advance, for charging the mold.

2. Mold-charging apparatus including a charge carrier comprising a body with vertically spaced horizontal plates having bores in vertical alinement, a bushing fitted in the aligning bores and of less height than the distance between the upper end of the bore in the upper plate and the lower end of the bore in the lower plate, a bushing fitted within the lower end portion of said first bushing and held against vertical displacement relatively to said plates, said bushings being inwardly beveled at their upper ends and the first bushing protruding above the second bushing, the exposed portions of the interiors of said bushings together with the exposed portion of the bore in the upper plate defining a charge-receiving cavity open at its upper and lower ends, a screw thread connection between the first bushing and the bore of the lower plate for vertical adjustment of the first bushing in the bores to vary the degree of said protrusion and thereby vary the capacity of said cavity, locking means in the space between the plates and engageable with the first bushing to lock it in its different adjustments; guide means supporting the carrier for horizontal reciprocation to shift said cavity between a charge-receiving position and a delivery position over a mold; and closure means to keep the lower end of the cavity closed when the cavity is away from its delivery position.

3. Mold charging apparatus according to claim 2, characterized in that the said vertically spaced plates having the alining bores are detachably secured to the carrier body.

4. Mold-charging apparatus including a charge carrier having a plurality of horizontally spaced vertical bores, a bushing fitted in each of said bores, a second bushing fitted in the lower end portion of said first bushing and secured against vertical shift the first bushing protruding above the second bushing, the exposed interiors of said bushings and the associated bores together defining charge-receiving cavities open at their upper and lower ends, screw means for vertically adjusting the first-mentioned bushings individually along said bores to vary the degree of said protrusion and thereby vary the capacity of said cavities, a common locking means for said adjustable bushings to lock htem in their different adjustments, and screw means to operate said locking means to lock said adjustable bushings simultaneously; means supporting the carrier for shifting to move said cavities between a charge-receiving position and a delivery position over a mold; and closure means to keep the cavities closed when they are away from their delivery position.

5. Mold-charging apparatus including a charge carrier having a vertical bore, a bushing rotatably and vertically shiftable within said bore and inwardly beveled at its upper end and having an external screw thread around its lower end portion, a fixed internal screw thread borne by the carrier and screw-engaged with said external thread, a second bushing fitted within said first bushing and inwardly beveled at its upper end, and means holding said second bushing against vertical shifting relatively to said bore, the first bushing protruding within the bore above the second bushing, the interiors of said bushings together with said bore defining a charge-receiving cavity open at its upper and lower ends and said screw connection rendering the first bushing vertically adjustable by rotating it to vary the degree of said protrusion and thereby vary the capacity of said cavity; means supporting the carrier for shifting to move the cavity between a charge-receiving position and a delivery position over a mold; and closure means to keep the lower end of the cavity closed when the cavity is away from its delivery position.

6. Mold-charging apparatus including a charge carrier having a vertical bore, a bushing rotatably and vertically shiftable within said bore and inwardly beveled at its upper end and having an external screw thread around its lower end portion, a fixed internal screw thread borne by the carrier and screw-engaged with said external thread, a second bushing fitted within said first bushing and inwardly beveled at its upper end, means holding said second bushing against vertical shifting relatively to said bore, the first bushing protruding within the bore above the second bushing, the interiors of said bushings together with said bore defining a charge-receiving cavity open at its upper and lower ends and said screw connection rendering the first bushing vertically adjustable by rotating it to vary the degree of said protrusion and thereby vary the capacity of said cavity, and locking means releasably engageable with the exterior of the first bushing at a point intermediate the ends of the latter to maintain such adjustment of the bushing; means supporting the carrier for shifting to move the cavity between a charge-receiving position and a delivery position over a mold; and closure means to keep the lower end of the cavity closed when the cavity is away from its delivery position.

FRANCIS S. FARLEY.